United States Patent [19]

Turner et al.

[11] Patent Number: 4,505,449
[45] Date of Patent: Mar. 19, 1985

[54] LIGHTWEIGHT CONCRETE CLADDED HEAVY EQUIPMENT BASE

[75] Inventors: George S. Turner, Conyers; Donald B. Mitchell, Lilburn, both of Ga.

[73] Assignee: Diversitech Corporation, Conyers, Ga.

[21] Appl. No.: 123,779

[22] Filed: Feb. 22, 1980

[51] Int. Cl.³ .............................................. F16M 3/00
[52] U.S. Cl. .................................... 248/669; 248/678; 248/346; 52/126.6; 52/309.2
[58] Field of Search .............. 248/669, 676, 678, 679, 248/633, 635, 346; 52/126.6, 309.2

[56] References Cited

U.S. PATENT DOCUMENTS

| 3,004,777 | 10/1961 | Buonaccorsi | 285/64 |
|---|---|---|---|
| 3,424,413 | 1/1969 | Applegate | 248/188.4 X |
| 3,653,341 | 4/1972 | Nielsen | 248/188.4 X |
| 4,044,520 | 8/1977 | Barrows | 52/309.12 |
| 4,056,251 | 11/1977 | Dixon | 248/346 X |
| 4,067,164 | 1/1978 | McMillan | 52/309.12 |
| 4,084,362 | 4/1978 | Piazza | 52/309.12 |
| 4,186,536 | 2/1980 | Piazza | 52/309.12 |
| 4,212,446 | 7/1980 | Domanick et al. | 248/346 X |
| 4,229,497 | 10/1980 | Piazza | 52/309.12 |

Primary Examiner—Dave W. Arola
Attorney, Agent, or Firm—Harvey B. Jacobson

[57] ABSTRACT

An expanded foam core such as a polystyrene foam board is covered on only its sides and top with a fiberglass reinforced cementitious material to form a solid base. Heavy steel coils can be embedded in the composite for receiving steel posts which serve to mount air conditioners or the like. Alternatively, a recess can be formed in the composition for use as a transformer pad.

7 Claims, 3 Drawing Figures

LIGHTWEIGHT CONCRETE CLADDED HEAVY EQUIPMENT BASE

BACKGROUND OF THE INVENTION

1. Field of the Invention

This invention relates to pads for the support of heavy equipment such as air conditioners, heaters and transformers.

2. Discussion of Related Art

The high cost of poured onsite concrete bases for various types of air conditioning, heating and electrical equipment has given rise to a growing market of precast concrete bases. Although such precast bases are usually less expensive than site poured bases, they are generally very heavy requiring heavy equipment or several laborers to set into place. Precast concrete bases are also expensive to ship and thus lose their cost advantage when transported to points at much greater distances than those within the local area.

Certain substitutes for precast concrete bases have been suggested. For instance, U.S. Pat. No. 4,050,659, issued Sept. 27, 1977, shows a transformer pad having a fiberglass reinforced plastic exterior surface and an expanded foam core. U.S. Pat. No. 4,023,755 issued May 17, 1977 to Alesi, Jr., shows a transformer mounting pad wherein structural support for the load is provided by a wood and foam core enclosed within a plastic shell, U.S. Pat. No. 3,772,845, issued May 27, 1973 to Unger, shows a ground mounting base for use with heat exchanger units. The base comprises a pad of concrete employing vermiculite as its primary aggregate, a wire screen reinforcement, and a top layer of sand aggregate concrete. U.S. Pat. No. 3,713,620, issued Jan. 30, 1973 to Tkach, shows a machine supporting slab formed of a rigid body of closed-cell foam resin material of high density covered by a metal sheath spanning the top and extending around the marginal edges of the body.

SUMMARY OF THE INVENTION

One object of the present invention is to provide a heavy equipment base which appears to be an ordinary solid concrete slab but which is in fact a low density material cladded with fibered concrete.

A further object of the present invention is to provide a heavy equipment base which is 1/16-⅛ the weight of an ordinary concrete base of the same size thus allowing ease of handling by installation personnel.

Yet another object of the present invention is to provide a heavy equipment base which is formed with a cushion on the bottom in order to allow a plurality of the bases to be stacked one upon another for shipment without need of protective spacers between the base. Also, by virtue of the padded bottom, less smoothing of the ground upon which the base is to rest is required since the base will more readily conform to the shape upon which it is set.

An even still further object of the present invention is to provide a heavy equipment base which is less subject to breakage than ordinary concrete bases.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
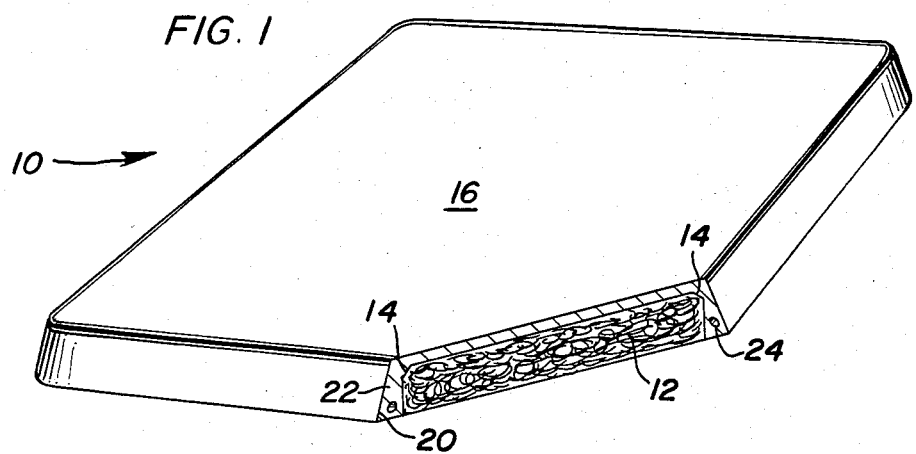
FIG. 1 is a perspective view of the lightweight concrete cladded heavy equipment base with a portion broken away showing the foam core.

Now with reference to the drawings, a lightweight concrete cladded heavy equipment base incorporating the principles and concepts of the present invention and generally referred to by the reference numeral 10 will be described in detail. Base 10, as seen in FIG. 1 comprises a substantially rectangular core 12 which is a polystyrene foam board, polyurethane foam board, urea-formaldehyde foam board or other low density insulating board having a compressive stength range of 1000-20,000 lbs. per sq. ft. The preferred material for core 12 is polystyrene foam since this is not subject to attack by soil conditions, fungus, bacteria, insects, or moisture, and will last indefinitely unless exposed to high temperatures (above 200° F.) and certain strong solvents and/or direct sunlight. The core 12 is provided with bevelled upper edges shown at 14 in order to increase the thickness of the concrete coating 16 which covers the core in that area. Concrete coating 16 is a fiberglass/cement composition using alkali resistant fiberglass strands. Non-alkali resistant glass and organic fibers may be used for a generally less durable product. The fiberglass coating can be any known composite and can be applied in any known manner as described, for instance, in U.S. Pat. Nos. 3,785,621; 3,852,082, 3,716,386; and 3,783,092. The coating 16 is applied around the sides of core 12 and over the top surface of the core leaving the bottom of the core exposed. The coating 16 is preferably ⅜ of an inch thick at the bottom 20 and tapers to ½ inch thick just below the bevel in the area generally labelled by the reference numeral 22. The top of the core 12 has a ⅜ of an inch thick layer of concrete applied thereto. In addition to the general reinforcing throughout the cement phase by alkali resistant fiberglass strands, steel rods 24 can optionally be embedded around the bottom of the coating 16 running parallel to the sides of core 12. While not necessary, a thin coating of cementitious material may also be applied to the core bottom, if desired.

By use of the low density polystyrene core 12, the base 10 will ultimately be of 1/6-⅛ the weight of an ordinary concrete base of the same size. Thus, a plurality of bases 10 can be shipped typically three to five times the distance for the same cost as an ordinary concrete slab of the same size. The bases can also be stacked one upon the other and shipped by conventional means without use of protective spacers between the bases since the exposed bottom of the foam core 12 acts as a cushion preventing damage to the top surface of the base stacked beneath the exposed bottom. The exposure of the bottom of the core 12 also allows for easier installation of the base since the polystyrene will conform to a ground configuration thus requiring less smoothing than that necessary for the installation of ordinary concrete bases.

Figure 2:
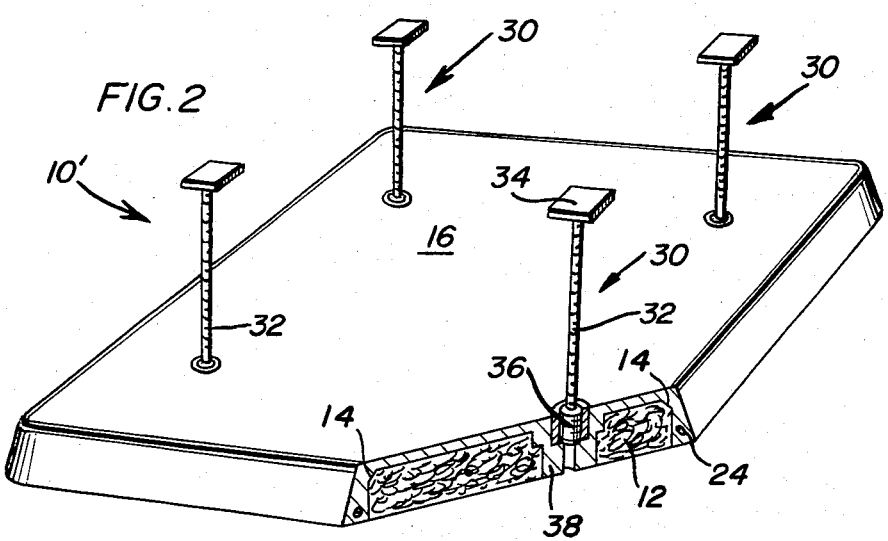
FIG. 2 is a perspective view of a lightweight concrete cladded heavy equipment base provided with threaded inserts mounting vertical stanchions.

Access recesses, mounting studs and threaded recesses as well as wires, tubing and stressed reinforcing cables may be built into the bases. As one example of the use of a threaded recess, FIG. 2 shows a base 10'. Base 10' is similar in every respect to base 10 including core 12 covered by coating 16. Base 10' is adapted to receive a heat pump and therefore is provided with a plurality of mounts 30. Each mount 30 comprises a threaded steel post 32 welded to a steel bearing plate 34. Steel bearing plates 34 are preferably $2\frac{1}{2}" \times 2\frac{1}{2}" \times 3/16"$ and are capped by a mastic material to insure a noiseless, secure mounting for the heat pump outdoor unit. The posts 32 are preferably provided in varying the heights from 8"-24" and each post is individually adjustable thereby allowing a level, vibration free installation. Heavy steel coils 36 forming threaded inserts are embedded in the composite concrete coating 16 to receive the threaded post 32 with the composite coating 16 including integral depending bosses 38 which are preferably 3 inches in diameter and formed from the fiberglass cement composite and are cast in one piece with the coating 16.

Figure 3:
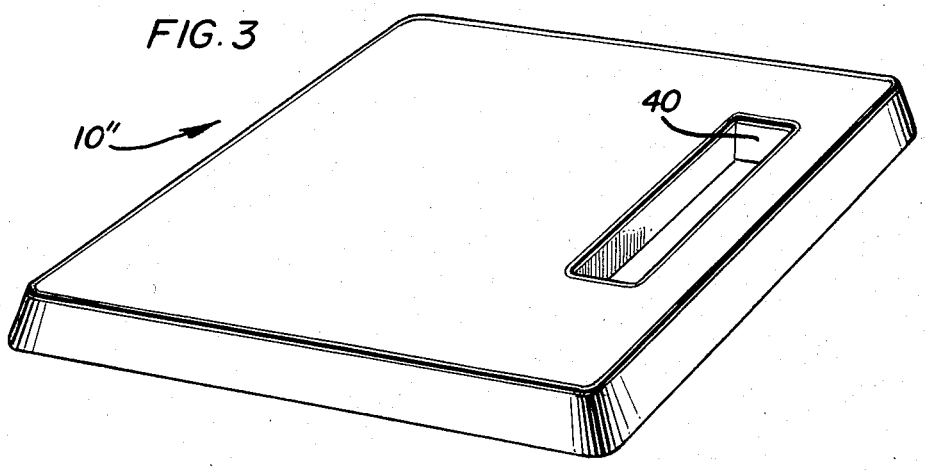
FIG. 3 is a perspective view of a lightweight concrete cladded heavy equipment base formed for use as a transformer pad.

As a final example of a base constructed according to the present invention, FIG. 3 shows a base 10" configured to receive a transformer. Accordingly, base 10" has the same core and coating as base 10 but formed with an upwardly opening recess 40 to receive a transformer. Other types of equipment may be placed on bases constructed according to the invention. Such equipment includes pumps, filters, compressors, engines, motors, electrical switching equipment, telephone booths, etc. as can be seen by one of ordinary skill in the art, the base shape can be altered to receive any of this equipment and, as mentioned hereinabove, studs, wires, etc. can be molded into the base as required.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A base for the support of equipment, said base comprising: a foam core having a top, a bottom and a plurality of side surfaces; and a coating attached to at least said top and all of said side surfaces of said foam core, said coating comprising a cementitious material, said cementitious material covering the top and sides only of said foam core.

2. The base as defined in claim 1 wherein said foam core comprises a polystyrene foam board.

3. The base as defined in claim 1 wherein said cementitious material comprises an alkali resistant fiberglass cement composite.

4. The base as defined in claim 1 and further including cementitious threaded casements embedded in said core for receiving threaded support rods.

5. The base as defined in claim 4 wherein said threaded casements are formed in one piece with said coating.

6. The base as defined in claim 5 and further including heavy steel coils embedded in said casements.

7. A base for the support of equipment, said base comprising: a lightweight foam core having a top surface, a bottom surface capable of performing as a cushion when stacking and a plurality of side surfaces; and a coating attached to only said top surface and all of said side surfaces of said foam core, said coating comprising a cementitious material including alkali resistant fiberglass strands in a cement composite, the coating of said top surface intermediate said plurality of side surfaces having a plurality of depending bosses, a steel coil embedded in each of said bosses for forming internally threaded inserts, a threaded support post adjustably threaded into each insert, said lightweight foam core having bevelled upper corner edges formed between said top surface and said plurality of side surfaces, said coating being thicker adjacent said bevelled upper corner edges relative to the thickness of said coating attached to said top surface, each of said threaded posts having a surmounting bearing plate attached on one end thereto above said base.

* * * * *

UNITED STATES PATENT AND TRADEMARK OFFICE
CERTIFICATE OF CORRECTION

PATENT NO. : 4,505,449

DATED : March 19, 1985

INVENTOR(S) : GEORGE S. TURNER and DONALD R. MITCHELL

It is certified that error appears in the above-identified patent and that said Letters Patent is hereby corrected as shown below:

On the tile page;

Page 1, column 1, line 2, in inventor Mitchell's name, delete "B" and substitute --R--.

Signed and Sealed this

Thirteenth Day of August 1985

[SEAL]

Attest:

DONALD J. QUIGG

*Attesting Officer*   *Acting Commissioner of Patents and Trademarks*